US006481730B2

(12) United States Patent
Sung

(10) Patent No.: US 6,481,730 B2
(45) Date of Patent: Nov. 19, 2002

(54) WALKER FRAME

(75) Inventor: Chung-Che Sung, Taichung Hsien (TW)

(73) Assignee: Genemax Medical Products Industry Corp., Taichung Hsien (TW)

(*) Notice: Subject to any disclaimer, the term of this patent is extended or adjusted under 35 U.S.C. 154(b) by 0 days.

(21) Appl. No.: 09/838,037

(22) Filed: Apr. 20, 2001

(65) Prior Publication Data

US 2002/0153684 A1 Oct. 24, 2002

(51) Int. Cl.7 .......... B62M 1/00

(52) U.S. Cl. .......... 280/87.05; 297/344.12; 482/68

(58) Field of Search .......... 280/87.021, 87.041, 280/87.05; 135/67, 65; 482/68; 297/344.12, 344.14, 344.18; 5/81.1 R, 586.1, 11, 611

(56) References Cited

U.S. PATENT DOCUMENTS 2,369,040 A * 2/1945 Grady .......... 280/219
4,165,127 A * 8/1979 Vago .......... 297/345
4,700,730 A * 10/1987 Samuelson et al. .......... 135/67
5,188,139 A * 2/1993 Garelick .......... 135/67
5,816,593 A * 10/1998 Che .......... 280/87.041
6,036,148 A * 3/2000 Shank .......... 248/188.5
6,082,384 A * 7/2000 Cheng .......... 135/66
6,311,708 B1 * 11/2001 Howle .......... 135/67
6,338,355 B1 * 1/2002 Cheng .......... 135/67

* cited by examiner

*Primary Examiner*—Brian L. Johnson
*Assistant Examiner*—Gerald Klebe
(74) *Attorney, Agent, or Firm*—Harrison & Egbert

(57) ABSTRACT

A walker frame includes two first support rods, two second support rods, two seat rods fastened between the first support rods and the second support rods, and a seat mounted on the two seat rods. The seat rods are provided with two locating seats. The first support rods and the second support rods are provided with a plurality of locating holes which are arranged at an interval along the longitudinal direction of the first support rods and the second support rods. The seat is adjusted in height by the locating seats which are located by the locating holes of the support rods.

1 Claim, 5 Drawing Sheets

WALKER FRAME

BACKGROUND OF THE INVENTION

1. Field of the Invention

The present invention relates generally to a supportive device used by lame people as an aid in walking, and more particularly to a walker frame.

2. Description of Related Art

As shown in FIG. 1, a walker frame of the prior art comprises a first frame 10 and a second frame 11, which are joined together by two seat rods 101 and 111. A seat 12 is fixedly mounted on the seat rods 101 and 111 such that the seat 12 cannot be adjusted in height in accordance with the height of a user of the prior art.

BRIEF SUMMARY OF THE INVENTION

The primary objective of the present invention is to provide a walker frame with a seat which is adjustable in height.

In keeping with the principle of the present invention, the foregoing objective of the present invention is attained by a walker frame comprising two first support rods, two second support rods, two seat rods, and a seat mounted on the two seat rods. The two seat rods are provided with two locating seats. The first support rods and the second support rods are provided with a plurality of locating holes. The seat is adjusted in height by the locating seats of the seat rods, which are located in the locating holes of the first support rods and the second support rods.

The features, functions, and advantages of the present invention will be more readily understood upon a thoughtful deliberation of the following detailed description of a preferred embodiment of the present invention in reference to the accompanying drawings.

DETAILED DESCRIPTION OF THE INVENTION

Figure 1:
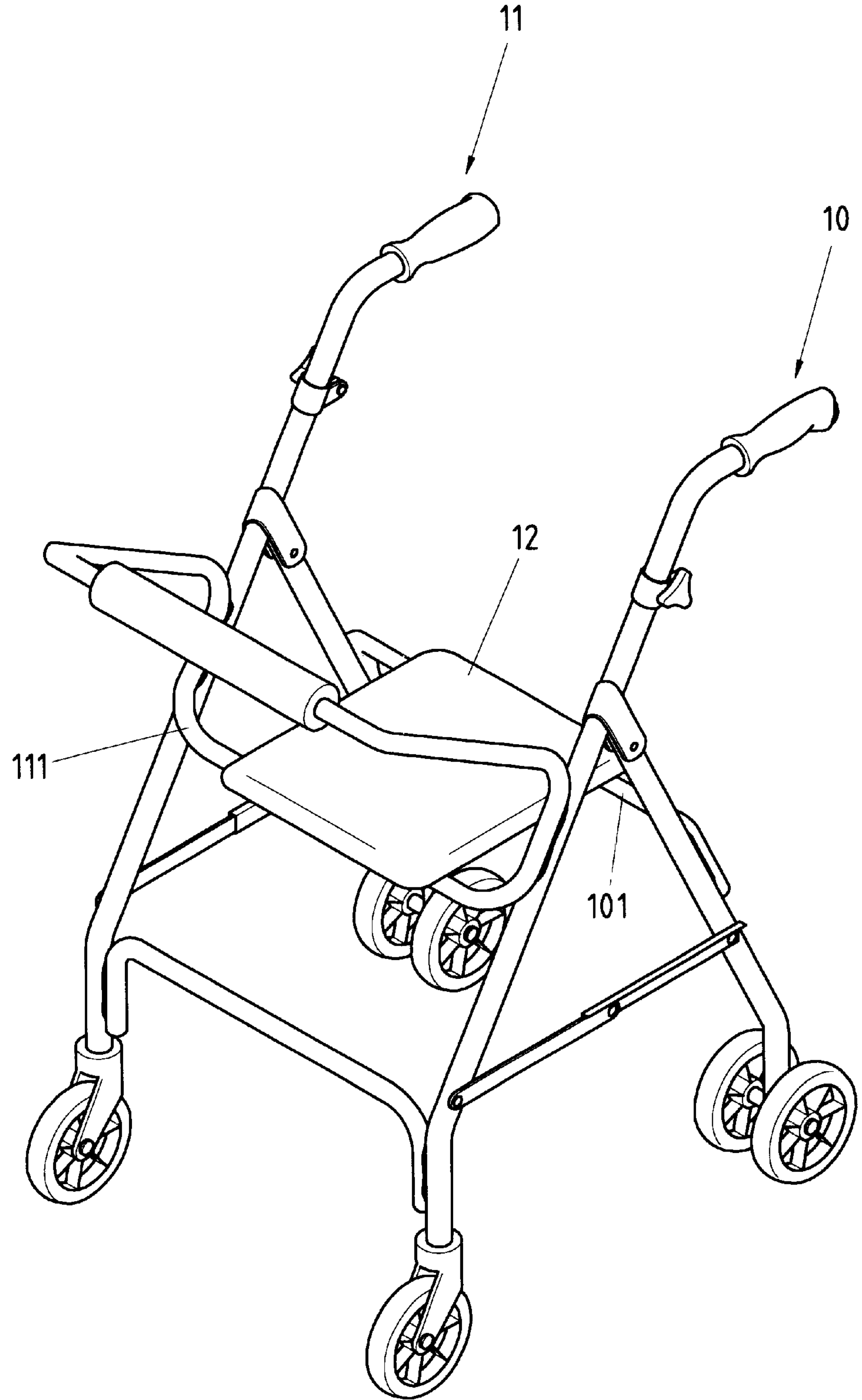
FIG.1 PRIOR ART
FIG. 1 shows a perspective view of a walker frame of the prior art.
Figure 2:
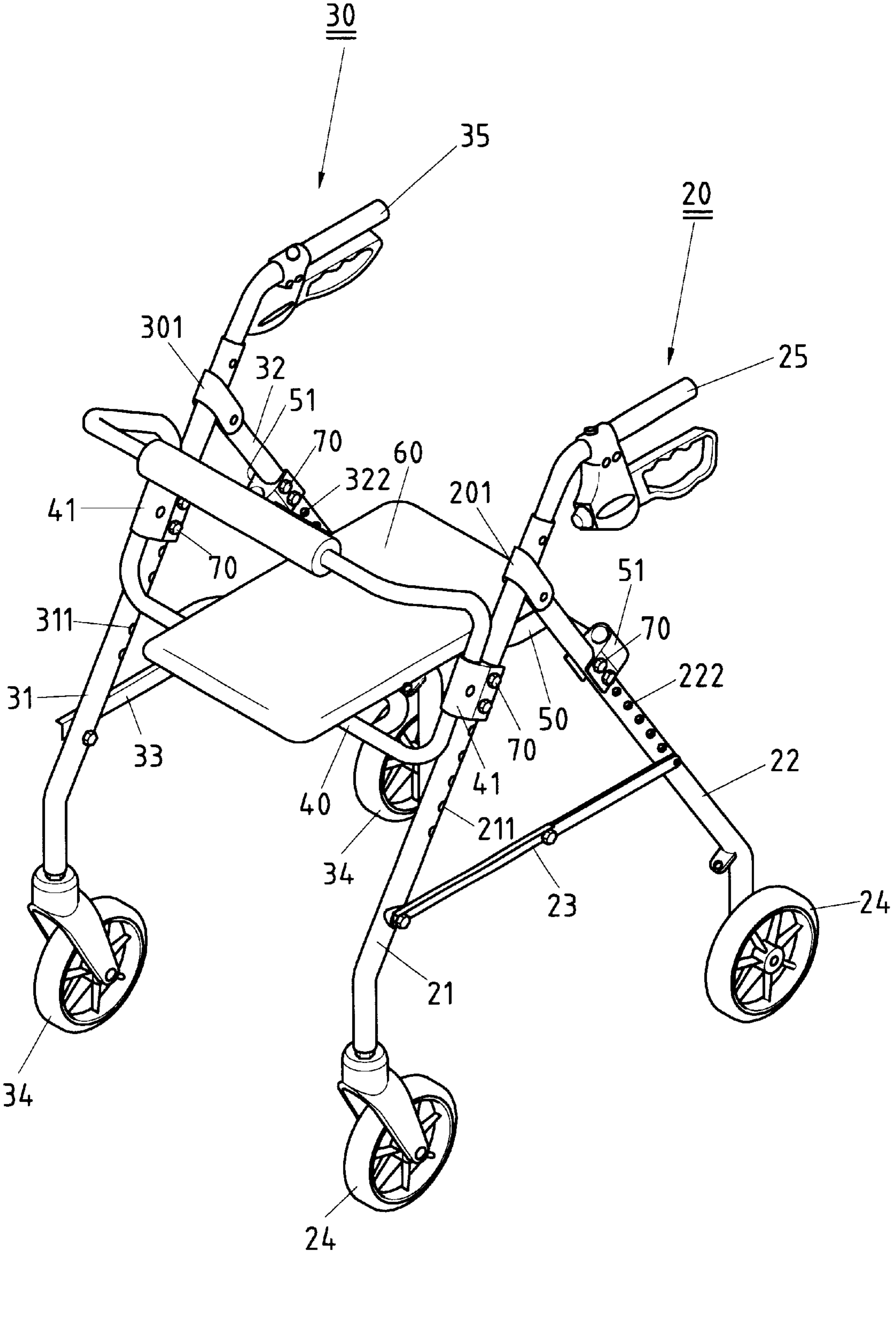
FIG. 2 shows a perspective view of the preferred embodiment of the present invention.
Figure 3:
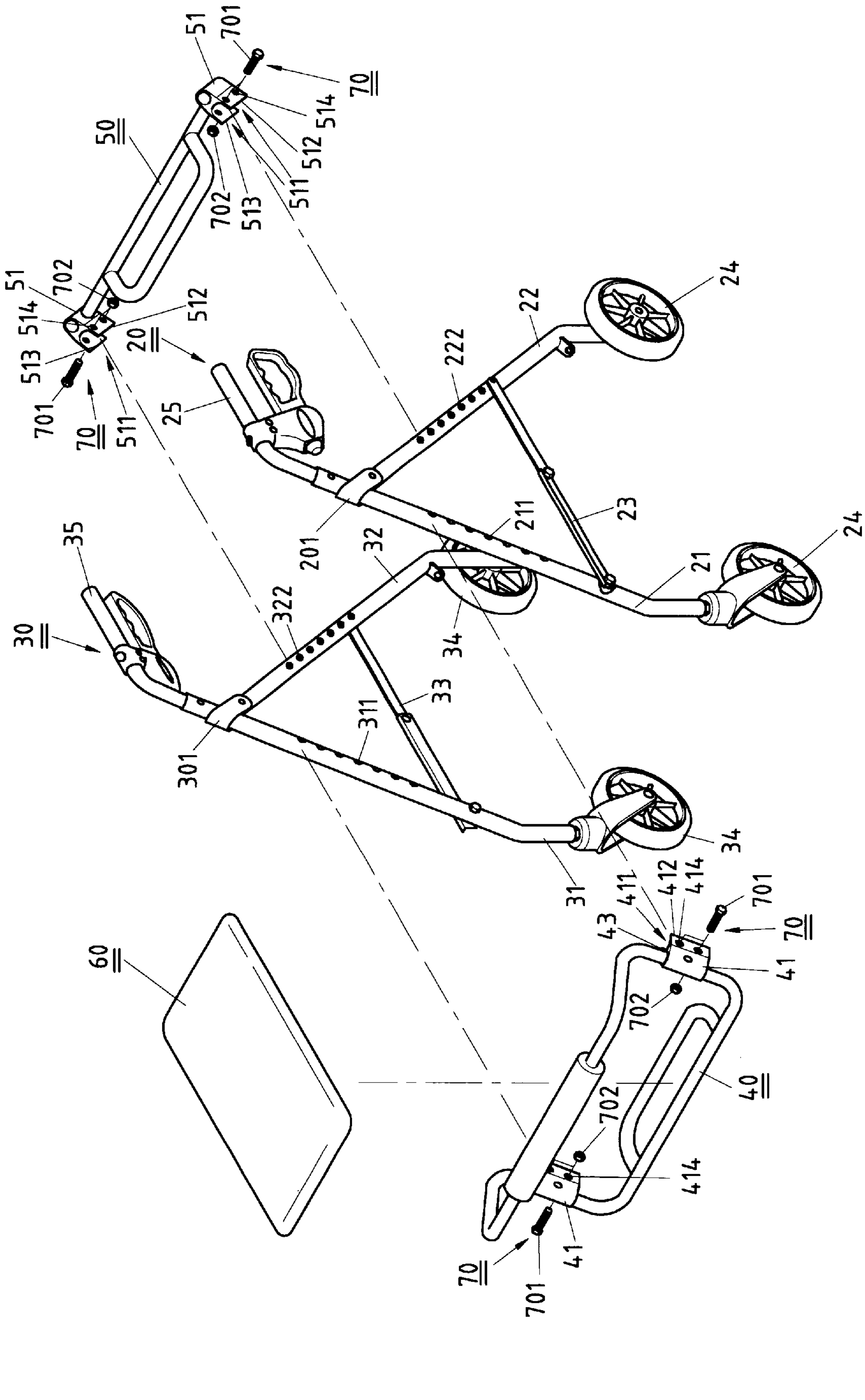
FIG. 3 shows an exploded view of the preferred embodiment of the present invention.
Figure 4:
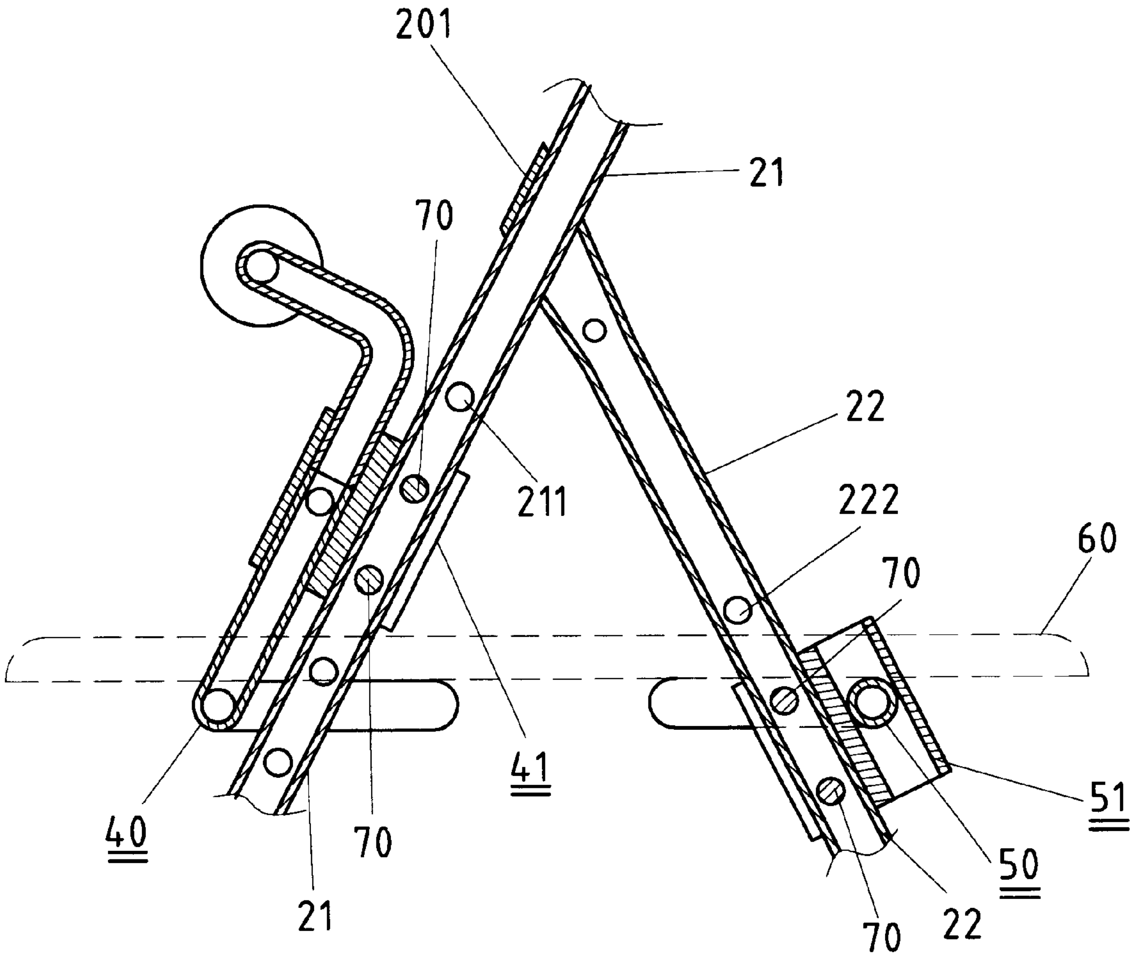
FIG. 4 shows a side sectional view of the first support rod, the second support rod, and the two seat rods of the preferred embodiment of the present invention.
Figure 5:
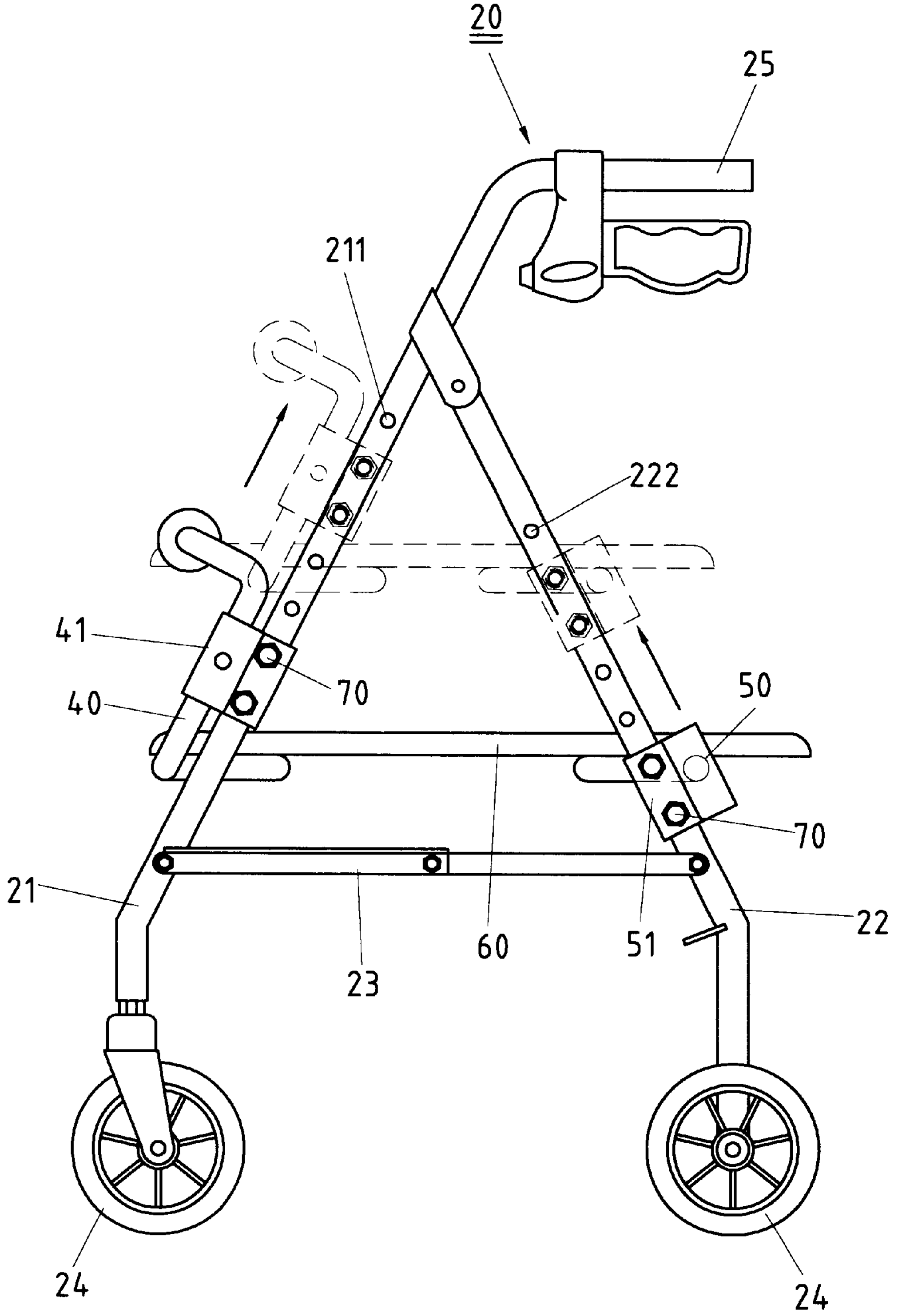
FIG. 5 shows a side schematic view of the adjustment in height of the seat of the preferred embodiment of the present invention.

As shown in FIGS. 2–5, a walker frame embodied in the present invention is used as a support in walking by the lame, convalescents, etc.

The walker frame of the present invention comprises two frames 20 and 30, two seat rods 40 and 50, and a seat 60.

The first frame 20 and the second frame 30 are basically similar in construction to each other and are formed of a first support rod 21, 31, a second support rod 22, 32 and a connection rod 23, 33 for connecting the first support rod and the second support rod. The first support rod 21, 31 is provided at the bottom end with a wheel 24, 34, and at the top end with a hand grip 25, 35. The second support rod 22, 32 is provided at the bottom end with a wheel 24, 34, and at the top end with an inverted U-shaped fastening piece 201, 301 by means of which the second support rod 22, 32 is fastened to the first support rod 21, 31.

The first seat rod 40 and the second seat rod 50 are adjustably fastened between the two frames 20 and 30 such that the first seat rod 40 is fastened to the first support rods 21 and 31, and that the second seat rod 50 is fastened to the second support rods 22 and 32.

The seat 60 is fixedly mounted on the two seat rods 40 and 50.

The walker frame of the preferred embodiment of the present invention is characterized by the first support rods 21 and 31, the second support rods 22 and 32, and the two seat rods 40 and 50.

The two first support rods 21 and 31 are respectively provided with a plurality of locating holes 211, 311, which are arranged at an interval along the longitudinal direction of the first support rods 21 and 31. Similarly, the two second support rods 22 and 32 are respectively provided with a plurality of locating holes 222, 322, which are arranged at an interval along the longitudinal direction of the second support rods 22 and 32.

The first seat rod 40 is provided with two locating seats 41 which are similar in construction to each other and are provided with a circular slot 411 for receiving the seat rod, and two fastening portions 412. One of the fastening portions 412 is opposite to the other fastening portion 412. The fastening portions 412 are each provided with at least one through hole 414. The through holes 414 of the fastening portions 412 are corresponding in location to each other. The first seat rod 40 is adjustably fastened with the two first support rods 21 and 31 by at least two fastening members 70 consisting of a bolt 701 and a nut 702. Similarly, the second seat rod 50 is provided with two locating seats 51 which are similar in construction to each other and are provided with a circular slot 511 for receiving the second seat rod 50, and two fastening portions 512 and 513 which are opposite to each other and are provided with at least one through hole 514. The through holes 514 of the two fastening portions 512 and 513 are corresponding in location to each other. The second seat rod 50 is adjustably fastened with the two second support rods 22 and 32 by at least two fastening members 70 consisting of a bolt 701 and a nut 702.

The first seat rod 40 is fastened adjustably at various levels of the first support rods 21 and 31 by the bolts 701 which are put through the through holes 414 of the locating seats 41 and any one of the locating holes 211 and 311 of the two first support rods 21 and 31. Similarly, the second seat rod 50 is adjustably fastened at various levels of the second support rods 22 and 32 by another bolts 701 which are put through the through holes 514 of the locating seats 51 of the second seat rod 50 and any one of the locating holes 222 and 322 of the two second support rods 22 and 32.

I claim:

1. A walking frame comprising:

a first frame having a first support rod and a second support rod and a connection rod, said connection rod connected to said first support rod and said second support rod, said first support rod having a wheel at a bottom end thereof and a handgrip at a top end thereof, said second support rod having a wheel at a bottom end thereof and a fastening piece at a top end thereof, said fastening piece connecting said top end of said second support rod with said first support rod;

a second frame having a first support rod and a second support rod and a connection rod, said connection rod of said second frame connected to said first and second support rods of said second frame, said first support rod of said second frame having a wheel at a bottom end thereof and a hand grip at a top end thereof, said second support rod of said second frame having a wheel at a bottom end thereof and a fastening piece at a top end thereof, said fastening piece of said second support rod of said second frame connecting said top end of second support rod of said second frame with said first support rod of said second frame;

a first seat rod adjustably fastened to said first support rod of said first frame and to said first support rod of said second frame;

a second seat rod adjustably fastened to said second support rod of said first frame and to said second support rod of said second frame; and a seat mounted on said first and second seat rods, said first support rod of each of said first and second frames having a plurality of locating holes arranged in spaced relation along a length thereof, said second support rod of each of said first and second frames having a plurality of locating holes arranged in spaced relation along a length thereof, each of said first and second seat rods having a first locating seat and a second locating seat at opposite ends thereof, said first and second locating seats having a generally identical configuration, each of said locating seats having a circular slot formed therein, said circular slot receiving the seat rod therein, each of said locating seats having a pair of fastening portions spaced from and facing each other, each of said pair of fastening portions having a through hole formed therein, said first seat rod being fastened to said first support rod of said first frame and to said first support rod of said second frame by a pair of fastening bolts extending through the respective through holes of the fastening portions of the locating seats and through respectively aligned select single holes of said plurality of locating holes respectively of said first support rod of said first frame and said first support rod of said second frame, said second seat rod being fastened to said second support rod of said first frame and to said second support rod of said second frame by another pair of fastening bolts extending through the respective through holes of the fastening portions of the locating seats and through respectively aligned select single holes of said plurality of locating holes respectively of said second support rod of said first frame and said second support rod of said second frame.

* * * * *